Figure 1:
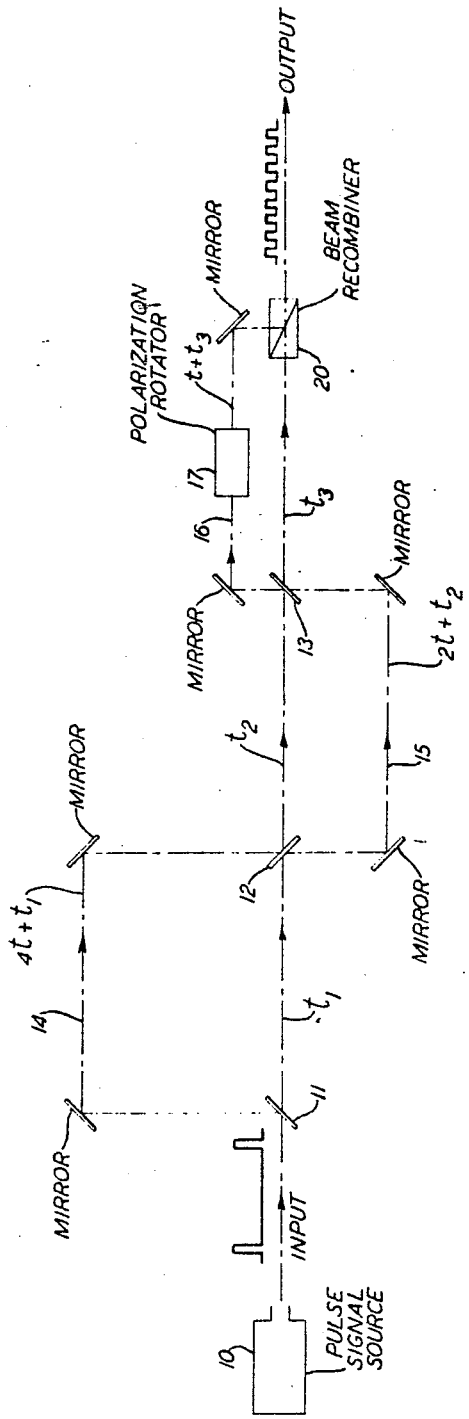

United States Patent Office 3,447,856
Patented June 3, 1969

3,447,856
OPTICAL PULSE MULTIPLIER
Owen E. De Lange, Rumson, N.J., assignor to Bell Telephone Laboratories, Incorporated, Murray Hill, N.J., a corporation of New York
Filed Oct. 7, 1966, Ser. No. 584,998
Int. Cl. G02f 1/26
U.S. Cl. 350—150                              4 Claims This invention relates to arrangements for increasing the pulse repetition rate of optical pulses.

It is known that when a laser oscillation is operated in a mode-locked state, it is capable of generating high intensity pulses at a rate that is inversely related to the length of the laser cavity. It has also been proposed that a mode-locked laser be used as a pulse source in an optical pulse code modulation (PCM) communication system. Typically, however, the pulse repetition rate of a mode-locked laser is much too low to be used directly for this purpose as it would be incapable of supplying the type and number of pulses required by the high bit rate communications system currently under development. What is required, therefore, is apparatus which operates upon the output pulses from a mode-locked laser in a manner to increase the pulse repetition rate. Various optical arrangements for doing this are described in the copending applications by C. B. Rubinstein, Ser. No. 514,628, filed Dec. 17, 1965, and by A. J. Rack, Ser. No. 498,505, filed Oct. 20, 1965, both assigned to applicant's assignee. Basically, in both these copending applications, the optical pulses in the original pulse train are divided, delayed relative to each other, and recombined along a common optical wavepath. In this manner, each of the original pulses is divided into a prescribed number of equal-amplitude pulses that are uniformly distributed in time between adjacent pulses of the original pulse train.

A pulse multiplier in accordance with the present invention operates in a similar fashion. However, substantial improvements and simplification are realized, in accordance with the invention, by successively dividing the pulses in a pulse train in half by means of a plurality of optical beam splitters, longitudinally distributed along the main optical beam path, and selectively delaying portions of said pulses relative to the other portions of said pulses. The requisite delay is obtained by means of parallel delay loops of varying lengths longitudinally distributed along the main optical path. All but the last delay loop are coupled to adjacent pairs of beam splitters.

After the prescribed number of additional pulses have been thus generated, the polarization of the pulses in one of the two parallel paths following the last beam splitter is rotated 90 degrees relative to the polarization of the pulses in the other path. All the pulses are then recombined into a single beam by means of a polarization sensitive beam recombiner to form a new train of equal-amplitude pulses having a higher pulse repetition rate than the original pulse train.

It is a feature of the present invention that the only losses in the system are those incidental losses associated with the beam splitters and mirrors. By the particular arrangement of the beam plitters and delay loops, the 3 db losses at the beam splitters in prior art structures are avoided.

It is another feature of the present invention that the number of additional pulses that are obtained can be readily varied simply by changing the number of beam splitters and delay loops located along the main optical path. No additional circuit changes are required.

Figure 4:
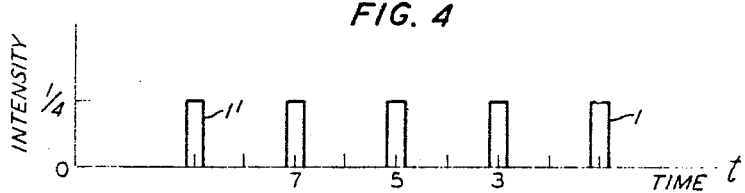
Figure 5:
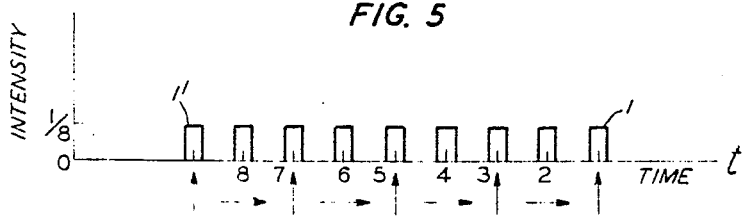
Figure 6:
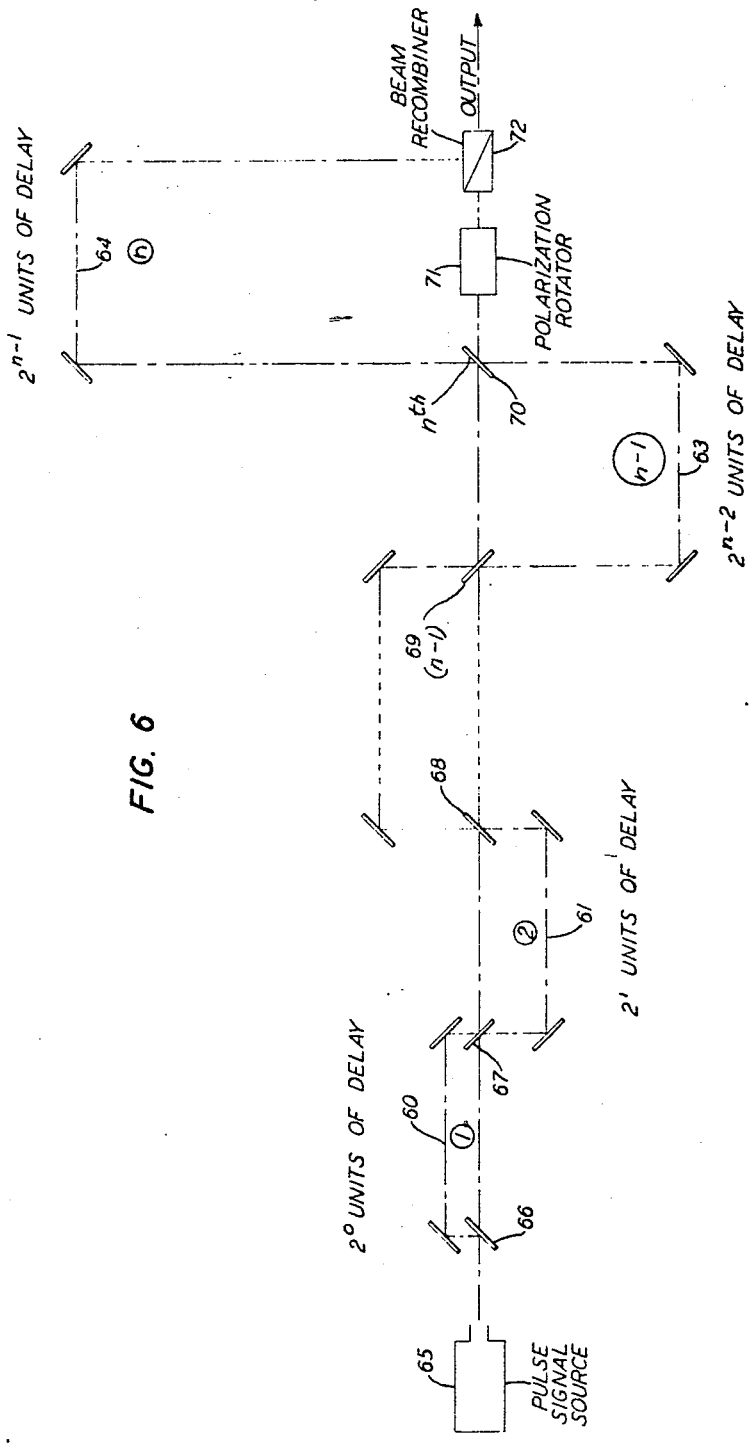

These and other objects and advantages, the nature of the present invention, and its various features, will appear more fully upon consideration of the various illustrative embodiments now to be described in detail in connection with the accompanying drawings, in which:

FIG. 1 shows a pulse multiplier, in accordance with the invention, for increasing the pulse repetition rate of an optical pulse train by a factor of eight;

FIGS. 2, 3, 4 and 5, included for purposes of explanation, show the energy distribution at different locations along the pulse multiplier of FIG. 1; and FIG. 6 shows a generalized pulse multiplier for increasing the pulse rate by a factor of $2^n$.

Referring to the drawings, FIG. 1 illustrates one embodiment of a pulse multiplier, in accordance with the invention, for increasing the pulse repetition rate of an optical pulse train by a factor of eight. This embodiment comprises three beam splitters 11, 12 and 13, a polarization rotator 17, a polarization sensitive beam recombiner 20, and a plurality of mirrors.

The pulse multiplier operates upon the optical pulses emitted by a pulse source 10 which may, for example, be a synchronously pulsed laser.

For purposes of explanation, the shortest wavepath between the input and output ends of the pulse multiplier will be referred to hereinafter as the main optical wavepath. In the embodiment of FIG. 1 this is represented by the horizontal line extending between the beam splitter 11 at the input end and the beam recombiner 20 at the output end. While shown as a straight path, it is understood that this is only by way of illustration. The main wavepath may just as readily be curved, or folded for compactness. Whatever the configuration, beam splitters 11, 12 and 13, and beam recombiner 20 are longitudinally distributed along the main wavepath. The beam splitters serve to divide the wave energy incident thereon into two equal portions by reflecting half and transmitting the other half. (See "Fundamentals of Optics," by F. A. Jenkins and H. E. White, McGraw-Hill Cook Company, Inc., third edition, page 270, for a discussion of one type of beam splitter.) The beam recombiner 20 serves to recombine the two beam portions incident therein into a single beam.

That portion of the wave energy that is not propagated along the main optical path, as a result of the operation of the beam splitters, is directed along one of the parallel delay loops 14, 15 or 16 by suitable means such as mirrors (as illustrated in FIG. 1), optical waveguides, or optical fibers. The first delay loop 14, extends between beam splitters 11 and 12. The second delay loop 15 extends between beam splitters 12 and 13, and the last delay loop 16 extends between beam splitter 13 and beam recombiner 20. In general, each delay loop extends between adjacent pairs of beam splitters or between the last beam splitter and the beam recombiner. In addition, the last delay loop 16 includes a polarization rotator 17 for rotating the direction of polarization of the wave energy therein 90 degrees relative to the direction of polarization of the wave energy in the main wavepath. Alternatively, the polarization rotator can be placed in the section of the main wavepath between beam splitter 13 and beam recombiner 20. In either case, the polarization rotator operates the rotate the direction of polarization of half the wave energy 90 degrees relative to the direction of polarization of the other half. The beam recombiner 20, which is polarization sensitive, can then serve to redirect the two incident optical beams into a single output beam.

Figure 2:
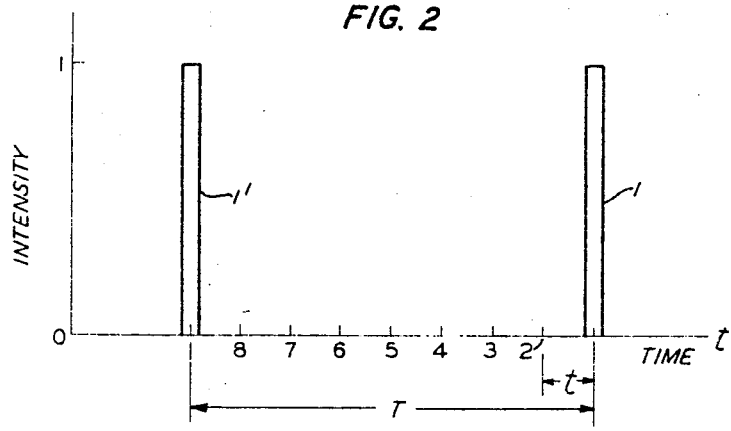

The operation of the pulse multiplier can be explained by reference to FIGS. 2, 3, 4 and 5 which show the energy distribution at different locations along the pulse multiplier. The first of these, FIG. 2, shows two pulses 1 and 1' of the original pulse train. The pulses have a normalized intensity of unity and are displaced in time relative to each other by an amount T, where T is equal to one divided by $f$, the pulse repetition rate. In order to increase the pulse repetition rate of the original pulse train by a factor of eight, the energy contained in each of the original pulses is divided among eight pulses that are uniformly spaced between adjacent pairs of pulses in the original pulse train. Referring again to FIG. 2, the interval T is shown divided into eight equal intervals of duration $t$, such that $8t=T$. The delay loops are then organized to selectively delay portions of the incident wave energy relative to other portions of said wave energy for periods of time that are multiples of $t$, and, thereby, to generate pulses at each of the pulse positions 2 through 8 shown in the interval T between pulses 1 and 1'. Designating the propagation time between beam splitters 11 and 12 as $t_1$, the propagation time around delay loop 14 is made equal to $4t+t_1$. Thus, delay loop 14 introduces four units of delay. Delay loop 15 is designed to introduce two units of delay, while loop 16 introduces one unit.

Figure 3:
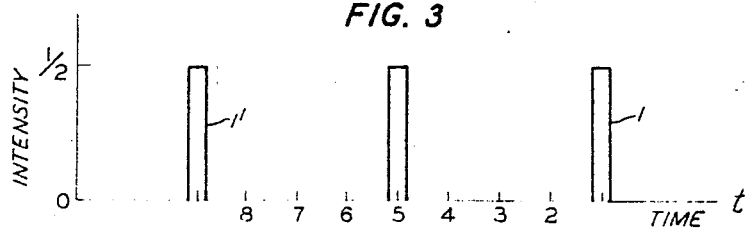

In opeartion, pulse 1 impinges upon beam splitter 11, and is divided into two equal parts. One part is transmitted through the beam splitter and propagates along the main optical path to beam splitter 12. This pulse is identified in FIG. 3 as pulse 1, occupying pulse position 1, and having an intensity of one-half. The other half of the pulse incident upon beam splitter 11 is reflected by the beam splitter and propagates around delay loop 14, arriving at beam splitter 12 four time units after pulse 1 and, in FIG. 3, is shown occupying pulse position 5. It too has an intensity of one half.

At the second beam splitter 12, half of pulse 1 is transmitted through the beam splitter, and propagates along the main wavepath to beam splitter 13. This portion of pulse 1 is represented in pulse position 1 in FIG. 4, and has an intensity that is now one-fourth that of the original pulse 1. The other half of pulse 1 is reflected by beam splitter 12 and propagates around loop 15. This portion of pulse 1 arrives at beam splitter 13 delayed two time units and, hence, is shown in FIG. 4 occupying pulse position 3. Similarly, pulse 5 is divided by beam splitter 12, with one-half propagating along the main wavepath, thereby maintaining its position as pulse 5, whereas the other half of pulse 5 propagates around delay loop 15, and arrives at beam splitter 13 in pulse position 7.

Each of the pulses 1, 3, 5 and 7, undergo similar division at beam splitter 13, with one half of the pulses maintaining their relative pulse positions, while the other half, propagating around delay loop 16, are delayed one pulse position and arrive at the beam recombiner 20 in pulse positions 2, 4, 6 and 8 as illustrated in FIG. 5. In addition, the direction of polarization of the pulses in delay loop 16 is rotated 90 degrees relative to the direction of polarization of the pulses in the main wavepath by rotator 17. The rotator can be any one of the many electro- or magneto-optic devices known in the art that are capable of rotating the polarization of optical waves. For an example of one such arrangement, using lithium tantalate, see the copending application of R. T. Denton, Ser. No. 579,101 filed Sept. 13, 1966, since abandoned in favor of continuation-in-part application Ser. No. 666,589, filed Sept. 11, 1967, and assigned to applicant's assignee.

The beam recombiner 20 can be any of the prisms typically used to separate orthogonally polarized light as for example, a nicol prism. As used in the embodiment of the invention illustrated in FIG. 1, such as prism is used to recombine two orthogonally polarized light beams to redirect them along a common direction. As examples of prisms that can be used for this purpose see pages 500 to 505 of the above-identified book by Jenkins and White.

The output pulse train, as illustrated in FIG. 5, consists of eight, uniformly spaced pulses, whose intensities are one-eighth the intensity of the original pulse 1. Though not shown, means are typically provided for modulating the output pulses or, alternatively, modulating means can be included in both the last delay loop 16, and along the main optical wavepath following beam splitter 13.

One of the features of the present invention is the simplicity whereby the number of pulses can be increased. For example, the number of output pulses can be doubled by the addition of only one beam splitter and one delay loop. More generally, to increase the pulse repetition rate of the input pulse train by a factor of $2^n$, where $n$ is an integer, requires $n$ beam splitters and $n$ associated delay loops plus, in all cases, a polarization rotator and beam recombiner at the last delay loop.

FIG. 6 shows a generalized pulse multiplier, in accordance with the invention, for increasing the pulse repetition rate by a factor of $2^n$. In particular, the first two delay loops 60 and 61 and the last two 63 and 64, these being the $(n-1)$st and the $n$th delay loops, are shown. The dotted portion therebetween is intended to indicate the third through the $(n-2)$nd delay loops, otherwise not shown.

The first delay loop 60 introduces $2^0$ units of delay. The second delay loop 61 introduces $2^1$ units of delay, while the $(n-1)$st loop 63 and the $n$th loop 64 introduce $(n-2)$ and $(n-1)$ units of delay respectively. In general, the delay introduced by each of the $n$ delay loops is given by $$2^i/2^n f$$

where:

$f$ is the pulse repetition rate of the original pulse train; and
$i$ is any integer between 0 and $(n-1)$ inclusive; and is different for each loop.

Also shown in FIG. 6 are the pulse signal source 65, the first three beam splitters 66, 67 and 68, the last two beam splitters 69 and 70 (these being the $(n-1)$st and the $n$th beam splitters), polarization rotator 71, and beam recombiner 72.

It will be noted in FIG. 6, that the shortest delay loop 61 is located at the input end of the multiplier, whereas in FIG. 1 the shortest delay loop 16 is located at the output end. This was done to illustrate that the order in which the delay is introduced is of no consequence. The various delay loops can be distributed along the main wavepath in any arbitrary manner without affecting the operation of the multiplier. It will be also noted that the polarization rotator 71 is located in the main wavepath rather than in the last delay loop 64. This was done simply to illustrate the earlier statement that its location could be in either wavepath. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A pulse multiplier for increasing the pulse repetition rate of optical pulses by a factor of $2^n$, where $n$ is an integer, comprising:

a plurality of $n$ beam splitters longitudinally distributed along a first wavepath for successively dividing optical pulses incident thereon into two equal portions and for coupling one of said portions out of said first wavepath;

a beam recombiner for recombining along a common wavepath orthogonally polarized optical pulses propagating along two different directions;

means for directing that portion of said pulses coupled out of said first wavepath by said beam splitters along distinctly different parallel delay loops of unequal lengths and for directing the pulses in each of the first $(n-1)$ delay loops onto the next successive beam splitters along said first wavepath;

means for introducing a 90 degree relative rotation between the directions of polarization of the pulses in said first wavepath and the pulses in said $n$th delay loop;

and means for directing the pulses in the $n$th delay loop along with the pulses in said first wavepath onto said beam recombiner.

2. The multiplier according to claim 1 wherein said means for introducing a 90 degree rotation is located in said $n$th delay loop.

3. The multiplier according to claim 1 wherein said means for introducing a 90 degree rotation is located in said first wavepath between said $n$th beam splitter and said beam recombiner.

4. The multiplier according to claim 1 wherein the delay introduced by each of the $n$ delay loops is given by $$\frac{2^i}{2^n f}$$

where:
 $f$ is the pulse repetition rate of the input optical pulses; and
 $i$ is an integer from 0 to $(n-1)$ inclusive, and is different for each loop.

References Cited
UNITED STATES PATENTS 3,384,839   5/1968   Miller.
3,393,955   7/1968   Sterzer.

DAVID SCHONBERG, *Primary Examiner.*

P. R. MILLER, *Assistant Examiner.*

U.S. Cl. X.R.

250—199; 350—147, 151, 160, 169